(12) United States Patent
Wood et al.

(10) Patent No.: US 8,094,403 B2
(45) Date of Patent: Jan. 10, 2012

(54) CORRECTING ERRORS IN POSITION OF AN HDD WRITE-HEAD

(75) Inventors: Roger William Wood, Gilroy, CA (US); James Terrence Olson, Santa Cruz, CA (US); Zhen Jin, Fremont, CA (US); Michael Paul Salo, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 172 days.

(21) Appl. No.: 12/435,220

(22) Filed: May 4, 2009

(65) Prior Publication Data
US 2010/0277827 A1 Nov. 4, 2010

(51) Int. Cl.
*G11B 21/02* (2006.01)
(52) U.S. Cl. ....... 360/75; 360/46; 360/77.02; 360/78.04
(58) Field of Classification Search .................. None
See application file for complete search history.

(56) References Cited

U.S. PATENT DOCUMENTS

| | | | | |
|---|---|---|---|---|
| 5,107,378 | A * | 4/1992 | Cronch et al. | 360/45 |
| 5,774,428 | A * | 6/1998 | Miyake et al. | 369/13.54 |
| 6,088,181 | A * | 7/2000 | Tanaka | 360/66 |
| 6,118,614 | A * | 9/2000 | Lee | 360/75 |
| 6,185,063 | B1 * | 2/2001 | Cameron | 360/78.04 |
| 6,445,521 | B1 * | 9/2002 | Schaff et al. | 360/31 |
| 6,476,989 | B1 | 11/2002 | Chainer et al. | |
| 6,624,957 | B1 * | 9/2003 | Yun | 360/25 |
| 6,700,718 | B2 * | 3/2004 | Wilson | 360/31 |
| 6,862,802 | B2 * | 3/2005 | Cruz et al. | 29/737 |
| 6,963,458 | B2 * | 11/2005 | Lamberts | 360/31 |
| 6,967,810 | B2 | 11/2005 | Kasiraj et al. | |

(Continued)

FOREIGN PATENT DOCUMENTS
EP 1521261 A2 6/2005

OTHER PUBLICATIONS

Roger Wood and Aleksandar Kavcic, The Feasibility of Magnetic Recording at 10 Terabits per Square Inch on Conventional Media, Presented as paper at TMRC 2008, Jul. 30-Aug. 1, Singapore, Singapore.

*Primary Examiner* — Dismery Mercedes
(74) *Attorney, Agent, or Firm* — Mahamedi Paradice Kreisman LLP; Christopher J. Brokaw

(57) ABSTRACT

A hard-disk drive (HDD) with a current adjustment component is provided. The current adjustment component changes an amount of current to a magnetic-recording head of the HDD to cause a change in the strength of a magnetic write field produced by the magnetic-recording head in response to a determination that a present position of the magnetic-head head is not in a desired position. To illustrate, in response to a determination that the present position of the magnetic-recording head is further away from an edge of a current track being written than a desired position of the magnetic-recording head, the current adjustment component increases the current to the magnetic-recording head to cause an increase in the strength of the magnetic write field. The change in the strength of the magnetic write field causes data, written by the magnetic-recording head, to be located at a desired location on the magnetic-recording disk.

19 Claims, 6 Drawing Sheets

U.S. PATENT DOCUMENTS

| | | | |
|---|---|---|---|
| 7,095,577 B1 * | 8/2006 | Codilian et al. | 360/46 |
| 7,149,043 B2 | 12/2006 | Ehrlich | |
| 7,170,705 B2 * | 1/2007 | Shimizu et al. | 360/60 |
| 7,177,110 B2 | 2/2007 | Ehrlich et al. | |
| 7,362,534 B1 * | 4/2008 | Schreck et al. | 360/75 |
| 7,660,059 B2 * | 2/2010 | Ahn et al. | 360/31 |
| 7,996,645 B2 * | 8/2011 | New et al. | 711/201 |
| 2002/0081461 A1 * | 6/2002 | Nishikawa et al. | 428/694 TR |
| 2003/0117914 A1 * | 6/2003 | Kanaoka et al. | 369/47.17 |
| 2003/0161061 A1 | 8/2003 | Lamberts | |
| 2004/0240101 A1 * | 12/2004 | Inaji et al. | 360/77.02 |
| 2005/0069298 A1 | 3/2005 | Kasiraj et al. | |
| 2005/0071537 A1 | 3/2005 | New | |
| 2007/0030588 A1 | 2/2007 | Tsuchinaga et al. | |
| 2007/0058281 A1 * | 3/2007 | Ohno et al. | 360/77.01 |
| 2007/0146922 A1 * | 6/2007 | Okada | 360/67 |
| 2007/0223132 A1 | 9/2007 | Tsuchinaga | |
| 2008/0094744 A1 * | 4/2008 | Inomata | 360/55 |

* cited by examiner

Shingle Writing Process

CORRECTING ERRORS IN POSITION OF AN HDD WRITE-HEAD

FIELD OF THE INVENTION

The present invention generally relates to approaches for correcting errors in the position of a write-head of a hard-disk drive (HDD).

BACKGROUND OF THE INVENTION

A hard-disk drive (HDD) is a non-volatile storage device, which is housed in a protective enclosure, that stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the space between a read/write head and the surface of a magnetic-recording disk must be tightly controlled. To provide a uniform distance between a read/write head and the surface of a magnetic-recording disk, an actuator relies on air pressure inside the hard drive enclosure to support the read/write heads at the proper distance away from the surface of the magnetic-recording disk while the magnetic-recording disk rotates. A read/write head therefore is said to "fly" over the surface of the magnetic-recording disk. That is, the air pulled along by a spinning magnetic-recording disk forces the head away from the surface of the magnetic-recording disk. When the magnetic-recording disk stops spinning, a read/write head must either "land" or be pulled away.

A write-head of a HDD records data onto the surface of a magnetic-recording disk in a series of concentric tracks. When a write-head writes data to a desired track of a magnetic-recording disk, it is important for the write-head to be located close to the desired track; failure to do so may result in a squeeze event, which may compromise data integrity and throughput, and in extreme cases, may result in hard errors and data loss. A squeeze event occurs when a write-head writes data too close to or overlapping with an adjacent track such that there is not enough of the adjacent track left for the adjacent track to be read properly by a read-head.

References markers may be recorded in each track of a magnetic-recording disk. These reference markers are referred to as servo information. To help properly position the write-head when writing data, a HDD employs a servo mechanical control loop to maintain the write head in the correct position using the servo information stored on the magnetic-recording disk. When a read-head reads the servo information (servo information being read may be referred to as a position-error signal, or PES), a relative position of the head may be determined by a servo processor to enable the position of the head, relative to the desired track, to be adjusted if necessary.

In the servo-mechanical control loop employed by a typical hard-disk drive, the position of the read/write head is usually known to a high degree of precision; however, the relatively slow response time in moving the mechanical parts of a HDD, such as the head-arm assembly (HAA) on which the read/write head is affixed, makes it difficult to accurately and rapidly correct errors in the position of the read/write head.

The possibility of a squeeze event increases with an increase in the density of tracks on the magnetic-recording disk. As a result, writing data in a shingle writing process is particularly susceptible to a squeeze event, as shingle writing will typically only be used in systems having extremely high track densities. In shingle writing, each data track is partially overwritten when an immediately contiguous data track is written.

SUMMARY OF THE INVENTION

Techniques are provided for correcting errors in the position of a write-head (also referred to herein as a magnetic-recording head) of a hard-disk drive (HDD). According to one embodiment of the invention, a hard-disk drive (HDD) comprises a current adjustment component. The current adjustment component changes an amount of current provided to the magnetic-recording head of the HDD to cause a change in the strength of a magnetic write field produced by the magnetic-recording head in response to a determination that a present position of the magnetic-head head is not in a desired position. To illustrate, in response to a determination that the present position of the magnetic-recording head is further away from an edge of a current track being written than a desired position of the magnetic-recording head, the current adjustment component increases the current to the magnetic-recording head to cause an increase in the strength of the magnetic write field. The change in the strength of the magnetic write field causes data, written by the magnetic-recording head, to be located at a desired location on the magnetic-recording disk.

In another embodiment of the invention, an HDD comprises a laser. The laser is configured to emit a laser beam upon the surface of the magnetic-recording disk for purposes of heating a portion of the surface of the magnetic-recording disk to render the heated portion of the surface more susceptible to the effects of the magnetic write field produced by the magnetic-recording head. In response to a determination that the present position of the magnetic-recording head is not is a desired or optimal position (and therefore the strength of the magnetic write field is either more or less than desirable), the power supplied to the laser may be adjusted. By adjusting the power to the laser beam, the heating effect of the laser beam produced by the laser may be adjusted, and the temperature of the surface of the magnetic-recording disk at the location which the data is intended to be written may be changed, which thereby enables the susceptibility of the magnetic surface of the disk to the magnetic write field to be configured according to the current strength of the magnetic write field relative to the desired location on the surface of the disk to which data is to be written. Such an embodiment may also employ a current adjustment component, and the power to the laser may be adjusted in conjunction with the adjustment of the write current to the magnetic-recording head by the current adjustment component to cause data, written by the magnetic-recording head, to be located at the desired location on the magnetic-recording disk.

In another embodiment of the invention, an HDD comprises a micro mechanical actuator. The micro mechanical actuator moves the magnetic-recording head relative to a head-arm assembly while maintaining a fixed distance between the magnetic-recording head and the surface of the magnetic-recording disk. In this way, in response to a determination that the present position of the magnetic-recording head is further away than is desirable from an edge of a current track being written, the micro mechanical actuator may move the magnetic-recording head closer to the desired position to cause an increase in the strength of the magnetic write field relative to the location on the surface of the magnetic-recording disk to which data is desired to be written. The relative change in the strength of the magnetic write field causes data, written by the magnetic-recording head, to be located at the desired location on the magnetic-recording disk. Note that the micro mechanical actuator does not change the strength of the magnetic write field produced by the magnetic-recording head, but by the micro mechanical actuator moving the magnetic-recording head perpendicular to the surface of the magnetic-recording disk, the micro mechanical actuator is able to adjust the relative strength of the magnetic write field from the perspective of the location on the surface of the magnetic-recording disk to which data is intended to be written. In an embodiment, the micro mechanical actuator may work in conjunction with the current adjustment component to cause data, written by the magnetic-recording head, to be located at the desired location on the magnetic-recording disk.

In another embodiment of the invention, an HDD comprises a micro fly height control. The micro fly height control is configured to change the distance between the magnetic-recording head and the surface of the magnetic-recording disk for purposes of changing the strength of the magnetic write field relative to the surface of the magnetic-recording disk. In this way, in response to a determination that the present position of the magnetic-recording head is further away than is desirable from an edge of a current track being written, the micro fly height control may move the magnetic-recording head closer to the surface of the magnetic-recording disk to cause an increase in the strength of the magnetic write field relative to the desired location on the surface of the magnetic-recording disk. The change in the relative strength of the magnetic write field at the desired location of the magnetic-recording disk causes data, written by the magnetic-recording head, to be located at the desired location on the magnetic-recording disk. In an embodiment, the micro fly height control may work in conjunction with the current adjustment component to cause data, written by the magnetic-recording head, to be located at the desired location on the magnetic-recording disk.

The above discussion is merely illustrative of certain embodiments, and is not intended to enumerate or describe all the embodiments of the inventions that are described in further detail below.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Approaches for correcting errors in the position of a write-head (also referred to as a magnetic-recording head) of a hard-disk drive (HDD) are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Embodiments of the invention employ various approaches for correcting errors in the position of a magnetic-recording head of a hard-disk drive (HDD). The position of a magnetic-recording head may become misaligned with respect to the data track to which it is writing for a variety of reasons. For example, bumping or moving the HDD when the magnetic-recording head is writing data to the magnetic-recording disk may cause the magnetic-recording head to move out of alignment. As another example, in the course of normal operation of the HDD, the magnetic-recording disk rotates rapidly, which can cause the air to circulate within the enclosure of the HDD. The rotation of the magnetic-recording disk or the circulating air flow in the course of normal operation may cause the magnetic-recording head to move slightly out of alignment.

Embodiments of the invention employ various approaches for correcting errors in the position of a magnetic-recording head of a hard-disk drive (HDD) such that, despite the position of the magnetic-recording head being less than optimal, the strength of the magnetic write field produced by the magnetic-recording head, the relative strength of the magnetic-write field from the desired write location on the magnetic-recording disk, or the susceptibility of the magnetic-recording disk to the magnetic write field may be adjusted to ensure data is written by the magnetic-recording head to the desired location on the surface of the magnetic-recording disk. It is recognized that writing data using a shingle writing process is particularly susceptible to writing data to an unintended location, as shingle writing will typically only be used in systems having extremely high track densities. Thus, a HDD which writes data using a shingle writing process may employ embodiments of the invention to avoid a squeeze event or otherwise writing data to an unintended location.

Shingle Writing

Figure 1:
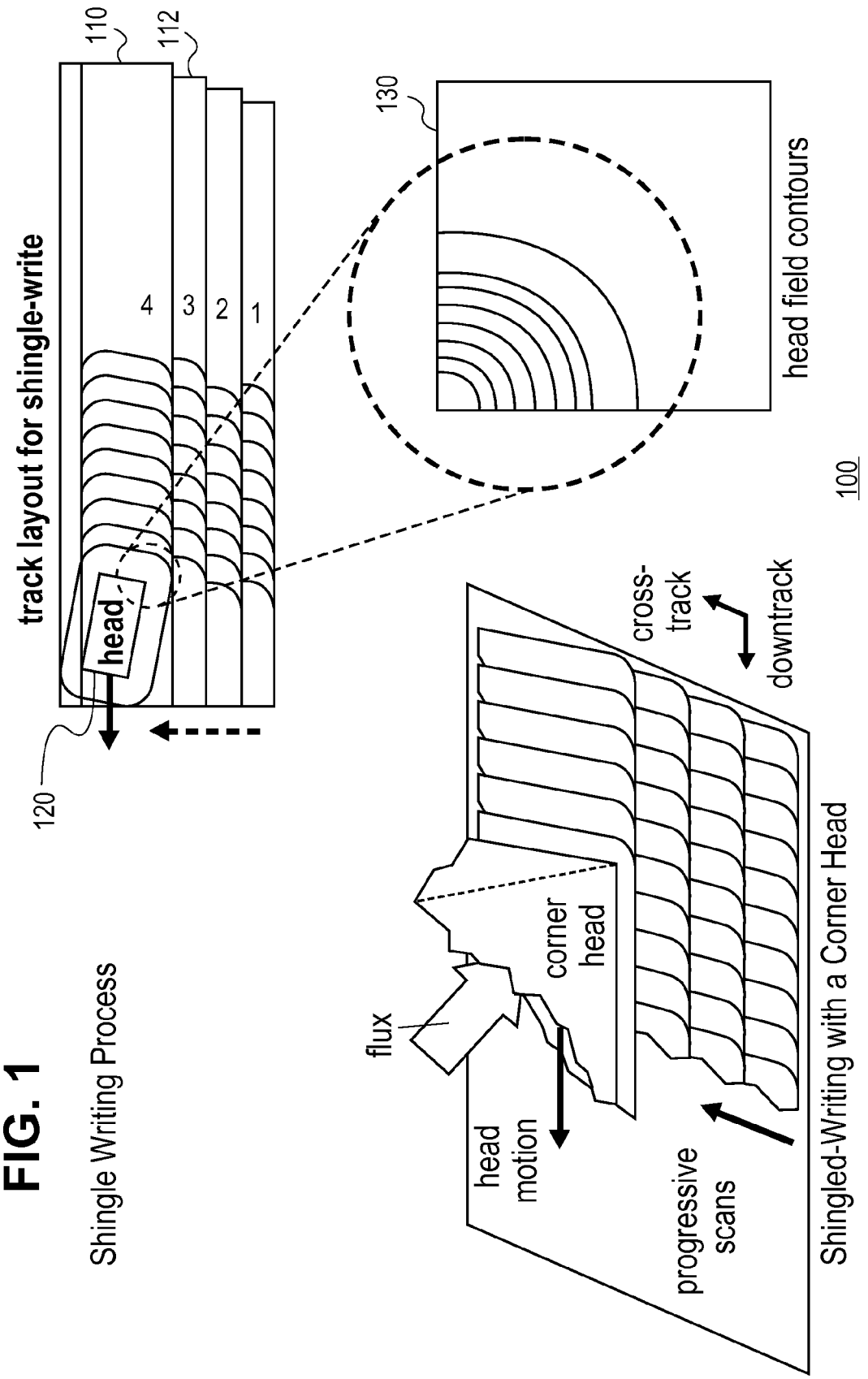
FIG. 1 is an illustration of a shingle-writing process according to an embodiment of the invention.

To facilitate understanding of particular contexts in which embodiments may be employed, a discussion of shingle writing is now presented. FIG. 1 is an illustration 100 of a shingle-writing process according to an embodiment of the invention. In shingle writing, each data track is partially overwritten when an immediately contiguous data track is written. As depicted in FIG. 1, in shingle writing, each track is initially written having a relatively large width (for example, see track 110), but once the track is partially overwritten by an immediately contiguous data track, the overwritten track has a smaller width, e.g., track 112 has been partially overwritten by track 110.

Typically, narrow data tracks require the magnetic-recording heads which write data to the narrow data tracks to also be narrow. However, narrow magnetic-recording heads generally produce weaker magnetic-write fields, which consequently have greater difficulty penetrating or affecting the magnetic-recording disk compared to stronger magnetic-write fields.

This problem is addressed and overcome by shingle writing. In shingle writing, the magnetic-recording head may produce a magnetic write field that is stronger than the width of each data track might suggest. As a result of each data track being partially overwritten by an immediately contiguous data track in shingle writing, the initial width of a data track may be larger than the resulting width after the data track is partially overwritten. Consequently, the strength of the magnetic write field produced by the magnetic-recording head in shingle writing may be strong enough to penetrate and properly affect the magnetic-recording disk. Even if the strength of the magnetic-write field is sufficient to affect a greater surface area of the magnetic-recording disk than is desired, the width of a data track may be adjusted to have a narrower width when the data track is partially overwritten by the immediately contiguous data track.

In an embodiment, the magnetic-recording head writes data to the magnetic-recording disk in one or more shingled tracks using only a corner of the magnetic-recording head. For example, FIG. 1 illustrates a magnetic-recording head 120 writing data to a plurality of shingled tracks. Magnetic-recording head 120 uses only a corner to generate the magnetic write field. A magnified view 130 of the contours of the magnetic write field generated by magnetic-recording head 120 is depicted in FIG. 1.

Additional details about shingled writing are available in U.S. Pat. No. 6,967,810, invented by Kasiraj et al., which is incorporated by reference for all purposes as if fully set forth herein. Having described the process of shingle writing, discussion about the physical description of illustrative hard-disk drives (HDDs) according to embodiments of the invention shall now be presented.

Physical Description of Illustrative Embodiments of the Invention

Figure 2:
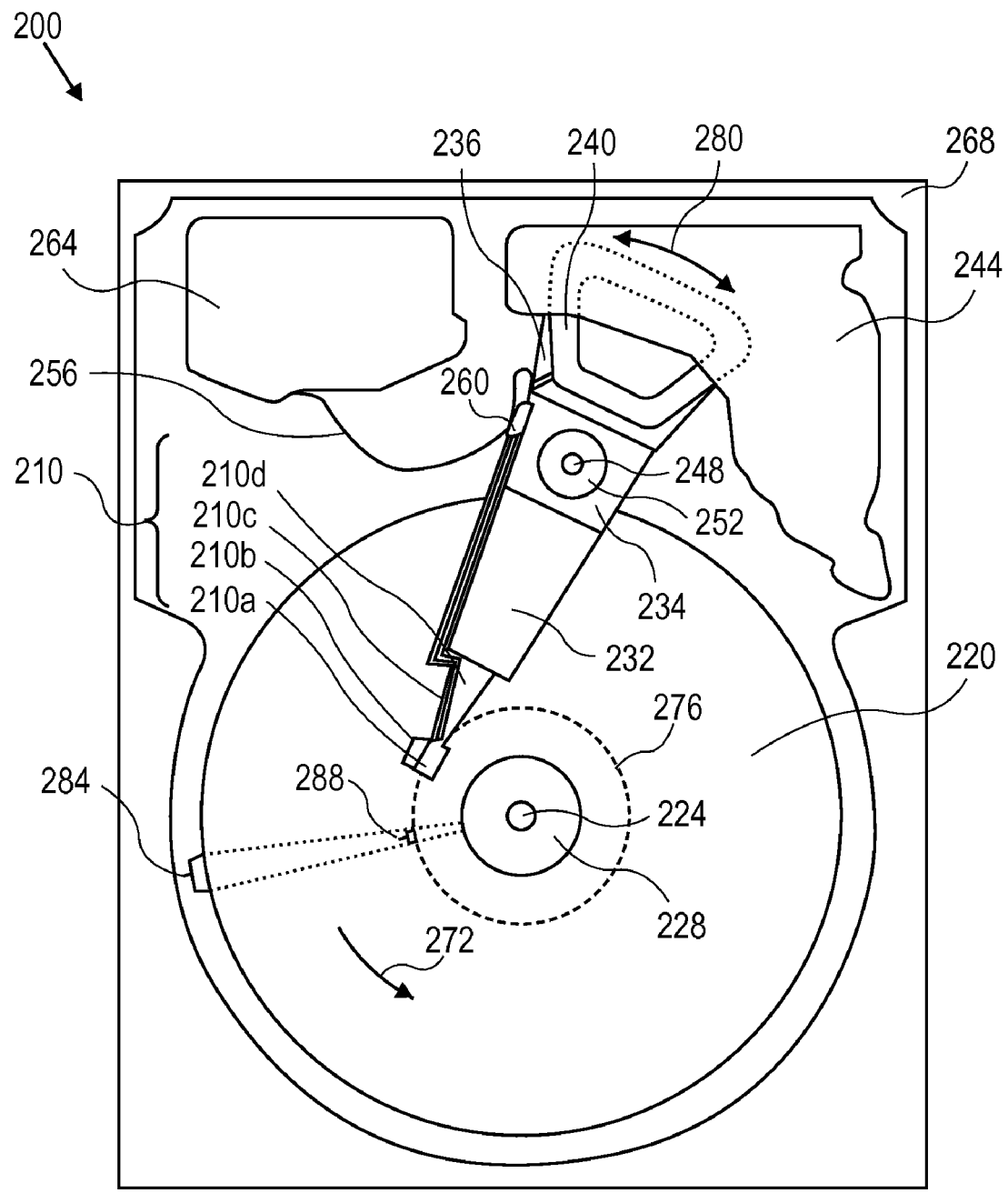
FIG. 2 is a plan view of an illustrative HDD according to an embodiment of the invention.

With reference to FIG. 2, in accordance with an embodiment of the invention, a plan view of an HDD 200 is shown. FIG. 2 illustrates the functional arrangement of components of the HDD including a slider 210b including a magnetic-recording head 210a. The HDD 200 includes at least one HGA 210 including the head 210a, a lead suspension 210c attached to the head 210a, and a load beam 210d attached to the slider 210b, which includes the head 210a at a distal end of the slider 210b; the slider 210b is attached at the distal end of the load beam 210d to a gimbal portion of the load beam 210d. The HDD 200 also includes at least one magnetic-recording disk 220 rotatably mounted on a spindle 224 and a drive motor (not shown) attached to the spindle 224 for rotating the disk 220. The head 210a includes a write element, a so-called writer, and a read element, a so-called reader, for respectively writing and reading information stored on the disk 220 of the HDD 200. The disk 220 or a plurality (not shown) of disks may be affixed to the spindle 224 with a disk clamp 228. The HDD 200 further includes an arm 232 attached to the HGA 210, a carriage 234, a voice-coil motor (VCM) that includes an armature 236 including a voice coil 240 attached to the carriage 234; and a stator 244 including a voice-coil magnet (not shown); the armature 236 of the VCM is attached to the carriage 234 and is configured to move the arm 232 and the HGA 210 to access portions of the disk 220 being mounted on a pivot-shaft 248 with an interposed pivot-bearing assembly 252.

With further reference to FIG. 2, in accordance with an embodiment of the invention, electrical signals, for example, current to the voice coil 240 of the VCM, write signal to and read signal from the PMR head 210a, are provided by a flexible cable 256. Interconnection between the flexible cable 256 and the head 210a may be provided by an arm-electronics (AE) module 260, which may have an on-board pre-amplifier for the read signal, as well as other read-channel and write-channel electronic components. The flexible cable 256 is coupled to an electrical-connector block 264, which provides electrical communication through electrical feedthroughs (not shown) provided by an HDD housing 268. The HDD housing 268, also referred to as a casting, depending upon whether the HDD housing is cast, in conjunction with an HDD cover (not shown) provides a sealed, protective enclosure for the information storage components of the HDD 200.

With further reference to FIG. 2, in accordance with an embodiment of the invention, other electronic components (not shown), including a disk controller and servo electronics including a digital-signal processor (DSP), provide electrical signals to the drive motor, the voice coil 240 of the VCM, and the head 210a of the HGA 210. The electrical signal provided to the drive motor enables the drive motor to spin providing a torque to the spindle 224 which is in turn transmitted to the disk 220 that is affixed to the spindle 224 by the disk clamp 228; as a result, the disk 220 spins in a direction 272. The spinning disk 220 creates a cushion of air that acts as an air-bearing on which the air-bearing surface (ABS) of the slider 210b rides so that the slider 210b flies above the surface of the disk 220 without making contact with a thin magnetic-recording medium of the disk 220 in which information is recorded. The electrical signal provided to the voice coil 240 of the VCM enables the head 210a of the HGA 210 to access a track 276 on which information is recorded. Thus, the armature 236 of the VCM swings through an arc 280 which enables the HGA 210 attached to the armature 236 by the arm 232 to access various tracks on the disk 220. Information is stored on the disk 220 in a plurality of concentric tracks (not shown) arranged in sectors on the disk 220, for example, sector 284. Correspondingly, each track is composed of a plurality of sectored track portions, for example, sectored track portion 288. Each sectored track portion 288 is composed of recorded data and a header containing a servo-burst-signal pattern, for example, an ABCD-servo-burst-signal pattern, information that identifies the track 276, and error correction code information. In accessing the track 276, the read element of the head 210a of the HGA 210 reads the servo-burst-signal pattern which provides a position-error-signal (PES) to the servo electronics, which controls the electrical signal provided to the voice coil 240 of the VCM, enabling the head 210a to follow the track 276. Upon finding the track 276 and identifying a particular sectored track portion 288, the head 210a either reads data from the track 276 or writes data to the track 276 depending on instructions received by the disk controller from an external agent, for example, a microprocessor of a computer system.

Embodiments of the invention also encompass HDD 200 that includes the HGA 210, the disk 220 rotatably mounted on the spindle 224, the arm 232 attached to the HGA 210 including the slider 210b including the head 210a. Embodiments of the invention may incorporate within the environment of the HDD 200 a filter for filtering airborne particles within a hard disk drive enclosure. Similarly, embodiments of the invention may incorporate within the environment of the HGA 210 a filter for filtering airborne particles within a hard disk drive enclosure.

Figure 3:
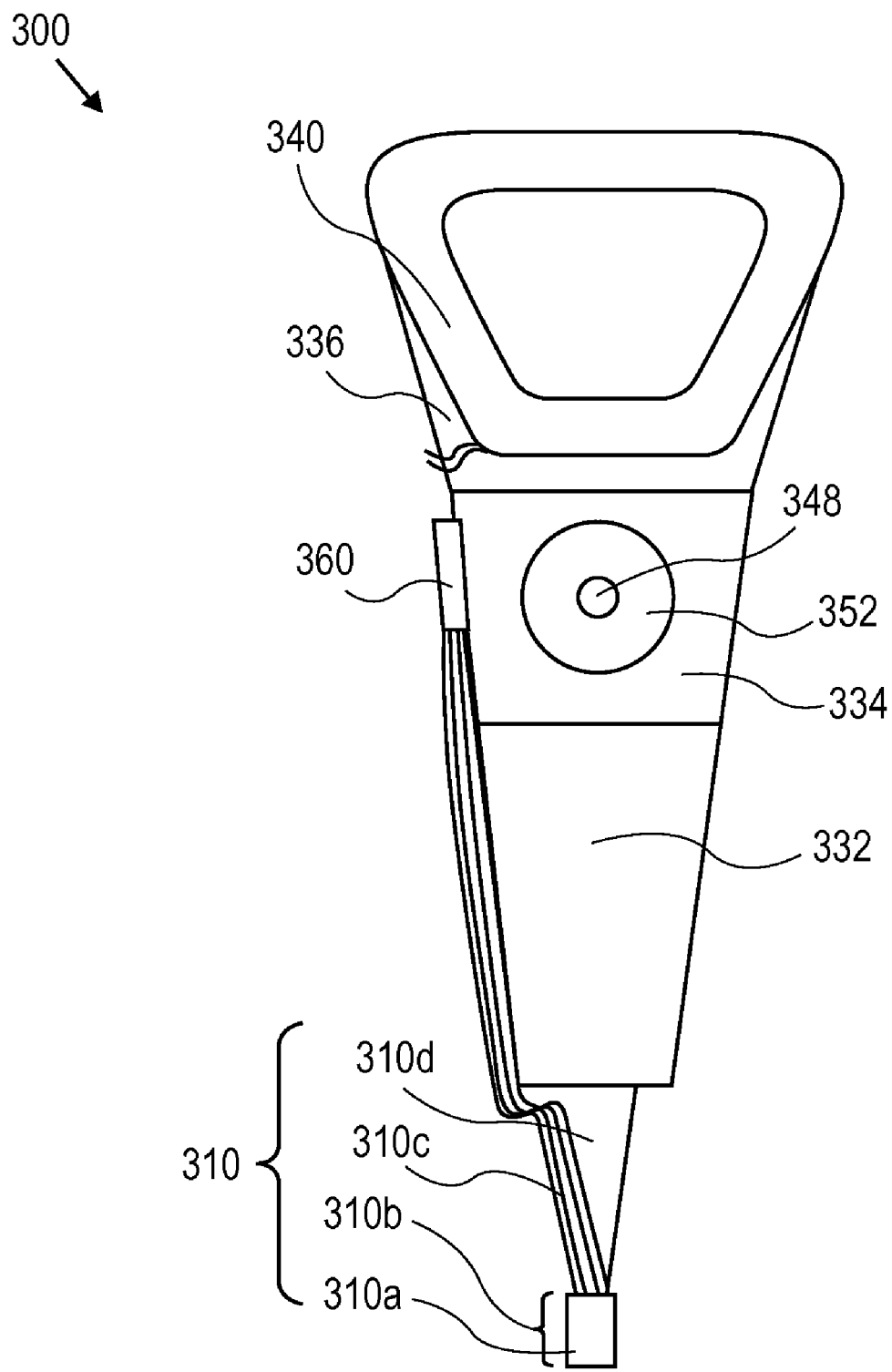
FIG. 3 is a plan view of a head-arm-assembly (HAA) according to an embodiment of the invention.

With reference now to FIG. 3, in accordance with an embodiment of the present invention, a plan view of a head-arm-assembly (HAA) 300 including the HGA 210 is shown. FIG. 3 illustrates the functional arrangement of the HAA with respect to the HGA 210. The HAA includes the arm 232 and HGA 210 including the slider 210b including the head 210a. The HAA is attached at the arm 232 to the carriage 234. In the case of an HDD having multiple disks, or platters as disks are sometimes referred to in the art, the carriage 234 is called an "E-block," or comb, because the carriage is arranged to carry a ganged array of arms that gives it the appearance of a comb. As shown in FIG. 3, the armature 236 of the VCM is attached to the carriage 234 and the voice coil 240 is attached to the armature 236. The AE 260 may be attached to the carriage 234 as shown. The carriage 234 is mounted on the pivot-shaft 248 with the interposed pivot-bearing assembly 252.

In an embodiment of the invention, HDD 200 may include a current adjustment component (not depicted). The current adjustment component is an electrical component that is capable of changing the amount of current supplied to head 210a to cause a change in the strength of a magnetic write field produced by head 210a. The write head current is provided by electronics (a write-driver) mounted on the moving actuator. Signals to adjust the write current would be received by the write-driver from the hard-disk controller (HDC) mounted on the electronics card. The adjustments are computed in the HDC which closes the servo control loop to maintain accurate track-following.

The write driver may employ a digital interface or an analog interface. If a digital interface is employed, then, in an embodiment, the digital interface should be updated frequently to accommodate high bandwidth track following. Alternately, if an analog interface is employed, then, in an embodiment, a dedicated analog control line may be used to accommodate high bandwidth track following.

The current adjustment component may be located in any location within HDD 200 which enables the current adjustment component to change the amount of current supplied to head 210a, such as, for example, the write-driver mounted on the moving actuator.

In an embodiment of the invention, HDD 200 may include a micro mechanical actuator (not depicted). The micro mechanical actuator may be located in any location within HDD 200 which enables the micro mechanical actuator to move head 210a relative to HAA 300 while maintaining a fixed distance between head 210a and the surface of the magnetic-recording disk. For example, in an embodiment, the micro mechanical actuator may be integrated into the suspension or positioned between the suspension and slider 210b.

In an embodiment of the invention, HDD 200 may include a micro fly height control (not depicted). The micro fly height control may be located in any location within HDD 200 which enables the micro fly height control to change the distance between head 210a and the surface of the magnetic-recording disk. For example, in an embodiment, the micro fly height control may be integrated into head 210a. In an embodiment, the micro fly height control may employ a small resistor (not depicted) to provide heat to cause a portion of the slider to expand and move closer to the disk surface, thereby changing the distance between head 210a and the surface of the magnetic-recording disk.

In an embodiment of the invention, HDD 200 may include a laser (not depicted). The laser may be located in any location within HDD 200 which enables the laser to emit a laser beam on a location on the surface of the magnetic-recording disk to which head 210a is attempting to write. For example, in an embodiment, the laser may be integrated onto the back of slider 210b and the extra electrical connections are made to slider 210b or the laser is remote on the arm or on the card and the light is guided to slider 210b through an optical fiber or through an optical waveguide.

Having presented a physical description of illustrative hard-disk drives (HDDs) according to embodiments of the invention, additional details about the process of correcting errors in the spatial position of head 210a will not be discussed.

Varying Current to Address Errors in Head Position

Figure 4:
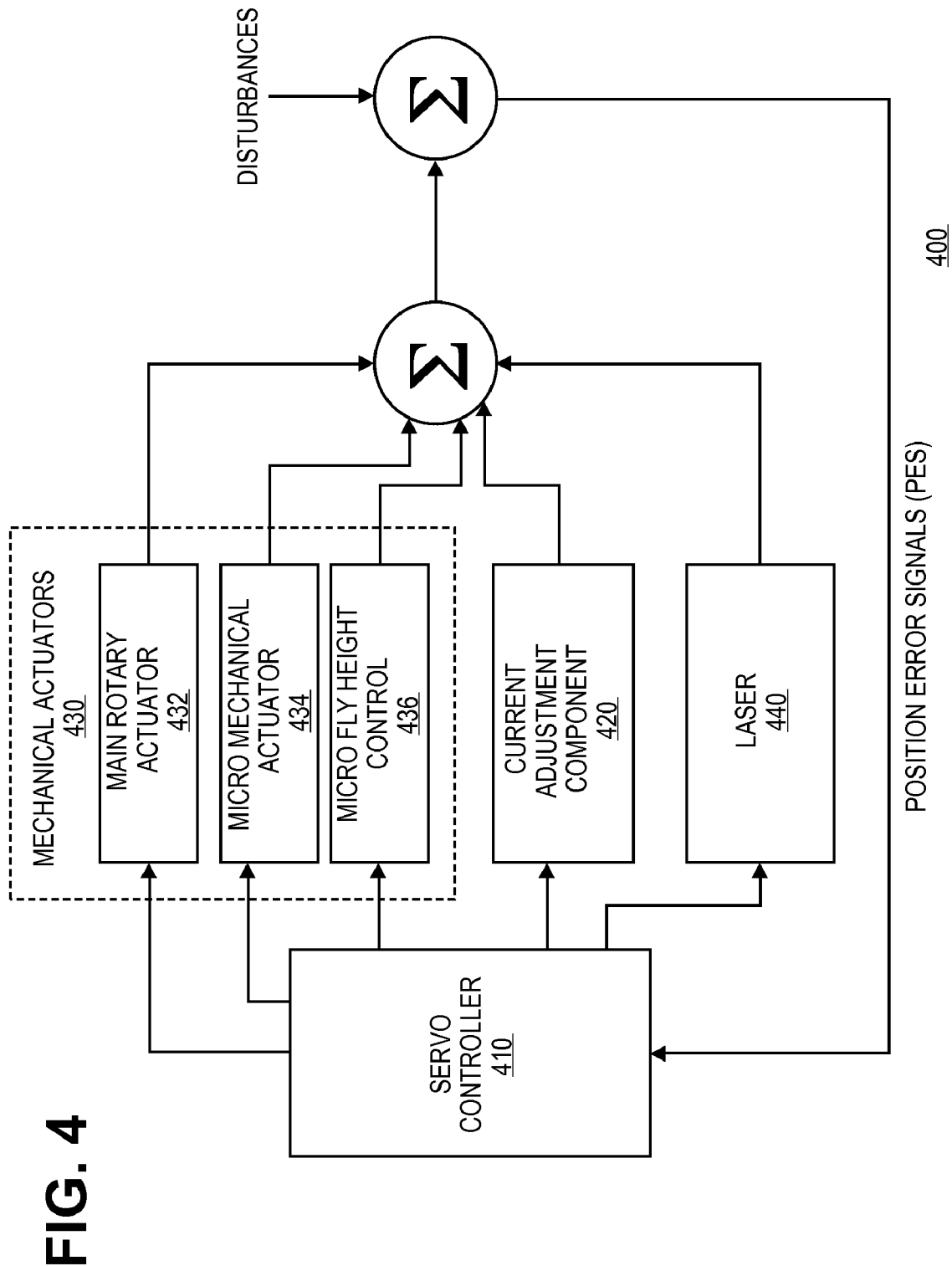
FIG. 4 is an illustration of a servo control-loop according to an embodiment of the invention.

FIG. 4 is an illustration of a servo control loop 400 according to an embodiment of the invention. Servo control loop 400 refers to the process, implemented by a servomechanism within HDD 200, of using error-sensing feedback to correct the position of a magnetic-recording head, such as head 210a. Using servo control loop 400, embodiments of the invention may correct errors in the spatial position of head 210a such that, despite the current position of head 210a being less than optimal, data may still be written to the desired track of the magnetic-recording disk.

As illustrated in FIG. 4, a servo controller 410 receives information about the current position of head 210a by processing position error signals (PES) that are read by head 210a. By processing the position error signals (PES), servo controller 410 may determine the spatial position of head 210a to a high degree of precision. Disturbances may cause head 210a to move from a desired or optimal spatial position for writing data to the magnetic-recording disk. When this happens, servo controller 410 may become informed that head 210a is positioned incorrectly by processing the position error signals (PES) that are read by head 210a.

If servo controller 410 determines that the current position of head 210a needs to be adjusted, then servo controller 410 may communicate with current adjustment component 420, one or more mechanical actuators 430, or both current adjustment component 420 and one or more mechanical actuators 430 to ensure that the magnetic write field, produced by head 210a, affects the desired position on the magnetic-recording disk.

Current adjustment component 420 refers to any mechanism for regulating the strength of a magnetic field produced by head 210a by adjusting the current supplied to head 210a. Current adjustment component 420 may thusly change the strength of the magnetic write field produced by head 210a without any physical movement of head 210a relative to HAA 300. Embodiments employing current adjustment component 420 may correct high frequency errors in the position of head 210a by adjusting the current supplied to head 210a using current adjustment component 420. In an embodiment, current adjustment component 420 does not affect the reading of data from the magnetic-recording disk, but instead, affects the writing of data to the magnetic-recording disk.

Mechanical actuator 430 refers to any mechanism capable of repositioning the spatial position of head 210a relative to HAA 300 or the surface of the magnetic-recording disk. A mechanical actuator 430 does not change the strength of the magnetic write field produced by head 210a; however, by physically moving head 210a, the relative strength of the magnetic write field produced by head 210a may change from the perspective of the desired write location on the magnetic-recording disk. Three examples of mechanical actuator 430 are main rotary actuator 432, micro mechanical actuator 434, and micro fly height control 436 (note that micro fly height control 436 affects a vertical adjustment that is perpendicular to the disk surface).

A mechanical actuator is generally slower than current adjustment component 420, as adjusting an electrical current supplied to head 210a may be performed faster than moving a mechanical part of a HDD. Indeed, as an electrical current may be adjusted or altered almost instantaneously, current adjustment component 420 is able to make very rapid changes to the strength of the magnetic write field produced by head 210a. To illustrate, in an embodiment, a mechanical actuator 430 may have a response time in the order of a few hundredths of microseconds, while current adjustment component 420 may be able to alter the supply of current to head 210a, and thereby affect the strength of the magnetic write field produced by head 210a, in the order of a few nanoseconds.

According to embodiments of the invention, head 210a ideally produces a magnetic write field that has a sharp boundary, a sharp gradient, and a sharp, tight radius in the corner. Such a magnetic write field is illustrated in magnified view 130 of FIG. 1. A magnetic write field with these characteristics writes data more efficiently to data tracks on the magnetic-recording disk.

The contour of the magnetic write field, produced by head 210a, is, in part, defined by the shape of the portion of head 210a which generates the magnetic write field. Additionally, the contour of the magnetic write field is influenced by the distance to and character of the disk soft underlayer. The size and strength of the magnetic write field is determined by the amount of current supplied to head 210a. By increasing the current supplied to head 210a, the contour of the magnetic-write fields expands; conversely, by decreasing the current supplied to head 210a, the contour of the magnetic-write fields contracts.

Figure 5:
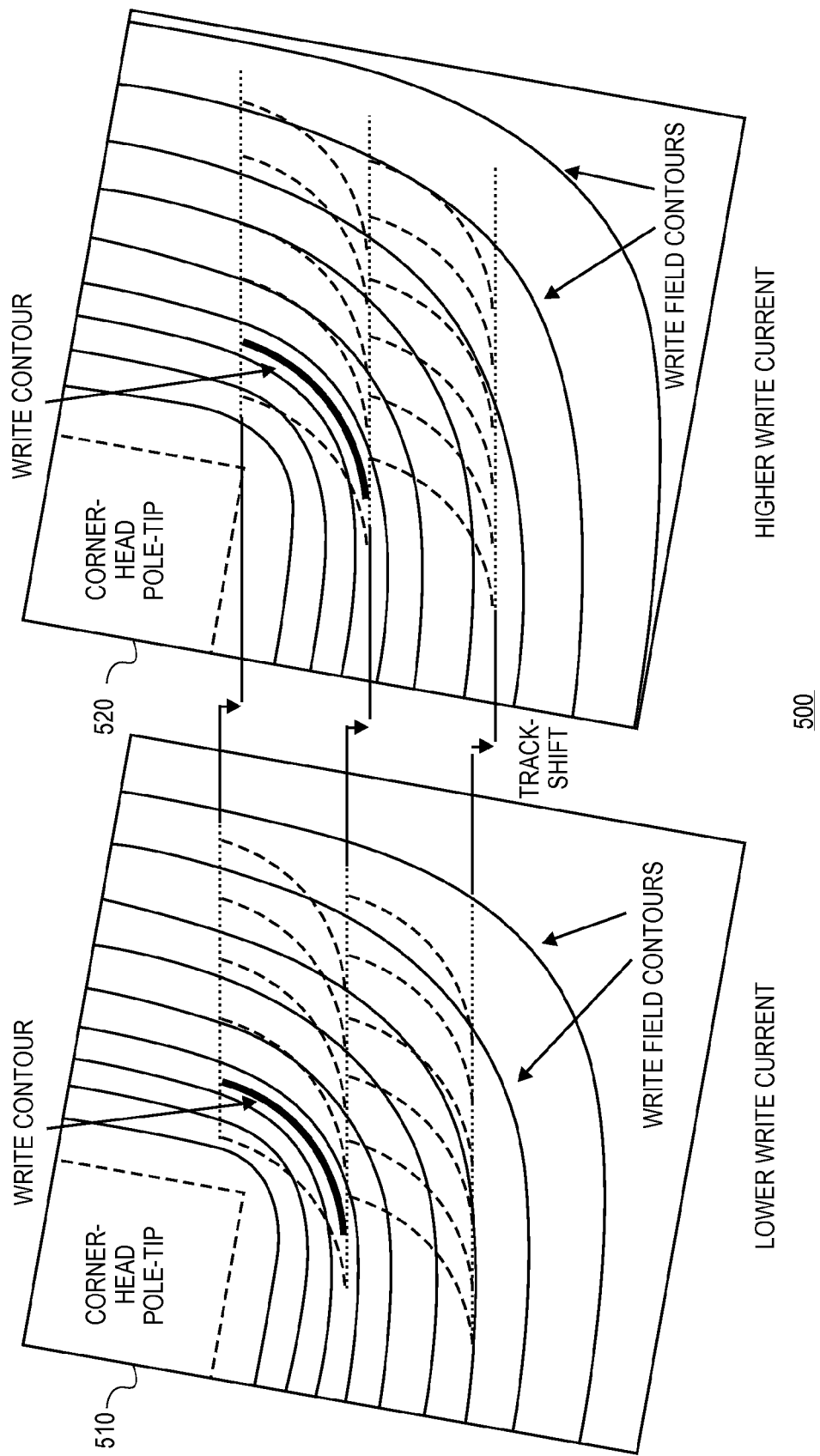
FIG. 5 is an illustration of the contours of the magnetic write field produced by a write head receiving a relatively lower amount of current and a relatively higher amount of current according to an embodiment of the invention.

To illustrate, FIG. 5 is an illustration of the contours of the magnetic write field produced by a write head receiving a relatively lower amount of current and a relatively higher amount of current according to an embodiment of the invention. As FIG. 5 illustrates, corner head pole-tip 510 is supplied a lower amount of current than corner head pole-tip 520. Accordingly, the contours of the magnetic write fields produced by corner head pole-tip 510 have a smaller radius than the contours of the magnetic write fields produced by corner head pole-tip 520. Also, as illustrated by FIG. 5, by increasing the amount of current to the write head, the location to where data is written by the magnetic write field generated by the write head may be moved further away from the write head. For example, FIG. 5 depicts a track shift which moves the location to where data is written further away from the write head in the depiction of the magnetic write field produced by corner head pole-tip 520.

In an embodiment, current adjustment component 420 may adjust the current supplied to head 210a between a range of a minimum and a maximum current. If head 210a is supplied too much current, then head 210a saturates, and the contours of the magnetic write field expand too much to effectively write data to tracks of the magnetic-recording disk. On the other hand, if the current supplied to head 210a is too low, then the contour of the magnetic write field produced by head 210a is positioned too close to head 210a to effectively write data to tracks of the magnetic-recording disk. Consequently, embodiments of the invention may implement current adjustment component 420 such that it regulates the current to head 210a between the minimum and the maximum level of current which enables head 210a to produce an effective magnetic write field.

In an embodiment, current adjustment component 420 may modulate the overall magnitude of the current supplied to head 210a. For example, current adjustment component 420 may modulate the current to supplied head 210a between around +/−10-15 milliamps.

To describe several illustrative mechanical actuators 430, a HDD according an embodiment of the invention will contain main rotary actuator 432. Main rotary actuator 432 refers to the mechanical actuator responsible for rotating head-arm-assembly (HAA) 300 to position head 210a over a desired position of the magnetic-recording disk. For example, main rotary actuator 432 may correspond to or by implemented by voice-coil motor (VCM) (that includes an armature 236 including a voice coil 240 attached to carriage 234) and a stator 244 (that includes a voice-coil magnet).

Embodiments of the invention may optionally include a micro mechanical actuator 424. Micro mechanical actuator 424 moves head 210a relative to a head-arm assembly (HAA) 300 while maintaining a fixed distance between head 210a and the surface of the magnetic-recording disk. Micro mechanical actuator 424 may move head 210a closer to a desired position for head 210a to occupy (while maintaining a fixed distance between head 210a and the surface of the magnetic-recording disk) when head 210a is writing data to cause an increase in the strength of the magnetic write field when head 210a writes data relative to the location on the surface of the magnetic-recording disk to which data is to be written. The relative change in the strength of the magnetic write field, from the perspective of the desired write location on the surface of the magnetic-recording disk, causes data, written by head 210a, to be located at the desired location (such as the desired track) on the magnetic-recording disk.

Embodiments of the invention may also optionally include micro fly height control 436, which shall be described in more detail below in the section entitled "Micro Fly Height Control."

Embodiments of the invention may employ one or more of current adjustment component 420, main rotary actuator 432, micro mechanical actuator 434, and micro fly height control 436. These components may work in conjunction with each other to cause data, written by head 210a, to be located at the desired location on the magnetic-recording disk. Thus, certain embodiments of the invention may include one or more of current adjustment component 420, main rotary actuator 432, micro mechanical actuator 434, and micro fly height control 436, while other embodiments of the invention may not include one or more of current adjustment component 420, micro mechanical actuator 434, and micro fly height control 436.

The operation of embodiments of the invention will now be explained with reference to FIG. 6, which is a flowchart 600 illustrating the functional steps performed by an HDD comprising current adjustment component 420 according to an embodiment of the invention. In step 610, a determination is made that the current position of head 210a is not in a desired or optimal position. In an embodiment, the determination of step 610 may be made by servo controller 410 in a servo control loop employed by the HDD. As discussed above, when the current position of head 210a is not in a desired or optimal position, servo controller 410 may become informed that head 210a is positioned incorrectly by processing the position error signals (PES) that are read by head 210. After the determination is made that the current position of the head 210a is not in a desired or optimal position, processing proceeds to step 620.

In step 620, the strength or impact of the electrical write field produced by head 210a is changed to compensate for the current position of head 210a. To illustrate, in response to a determination that the present position of the magnetic-recording head is further away from an edge of a current track being written than a desired position of the magnetic-recording head, current adjustment component 420 increases the current supplied to the head 210a to cause an increase in the strength of the magnetic write field. On the other hand, in response to a determination that the present position of the magnetic-recording head is too close to an edge of a current track being written than a desired position of the magnetic-recording head, current adjustment component 420 decreases the current supplied to the head 210a to cause an decrease in the strength of the magnetic write field. The change in the strength of the magnetic write field causes data, written by the magnetic-recording head, to be located at a desired location (such as the desired track) on the magnetic-recording disk. In this way, despite the current location of head 210a being in a less than optimal or desirable position, data may still be written to a desired location on the magnetic-recording disk.

In an embodiment, step 620 may be performed by current adjustment component 420. As explained above, current adjustment component 420 may adjust the amount of current supplied to head 210a to cause a change in the strength of the magnetic write field generated by head 210a to compensate for the current position of head 210a.

In another embodiment, step 620 may be performed by current adjustment component 420 working in conjunction with a mechanical actuator, such main rotary actuator 432, micro mechanical actuator 434, or micro fly height control 436. In such an embodiment, current adjustment component 420 may adjust the amount of current supplied to head 210a to cause a change in the strength of the magnetic write field generated by head 210a while one or more of main rotary actuator 432, micro mechanical actuator 434, or micro fly height control 436 moves the position of head 210a closer to a desired or optimal position. In this way, current adjustment component 420 and one or more mechanical actuators may work together to adjust the strength of the magnetic write field, generated by head 210a, relative to the desired location on the magnetic-recording disk to which data is desired to be written to compensate for the current position of head 210a.

In another embodiment, in step 620, a laser 400 may be used to heat a portion of the surface of the magnetic-recording disk to render the heated portion of the surface more susceptible to the effects of the magnetic write field produced by the magnetic-recording head. Such an embodiment will be described in further detail below in the section entitled "Employing a Laser to Correct Errors in Position."

Embodiments of the invention may employ current adjustment component 420 to write data to the magnetic-recording disk, using the magnetic write field generated by head 210a, to one or more shingled tracks. The data written by head 210a using current adjustment component 420 may, but need not, include servo data. Thus, embodiments of the invention may use current adjustment component 420 to write user data, and not servo data, to the magnetic-recording disk to one or more tracks, which may be, but need not be, shingled tracks.

Having described how an error in the current spatial position of head 210a may be overcome to cause data to be written in the desired location on the magnetic-recording disk according to certain embodiments of the invention, additional details about micro fly height control 436 will now be discussed.

Micro Fly Height Control

In an embodiment of the invention, an HDD comprises micro fly height control 436. Micro fly height control 436 is configured to change the distance between head 210a and the surface of the magnetic-recording disk for purposes of changing the strength of the magnetic write field relative to the surface of the magnetic-recording disk. In an embodiment, micro fly height control 436 may only change the distance between head 210a and the surface of the magnetic-recording disk in the order of several nanometers.

Figure 6:
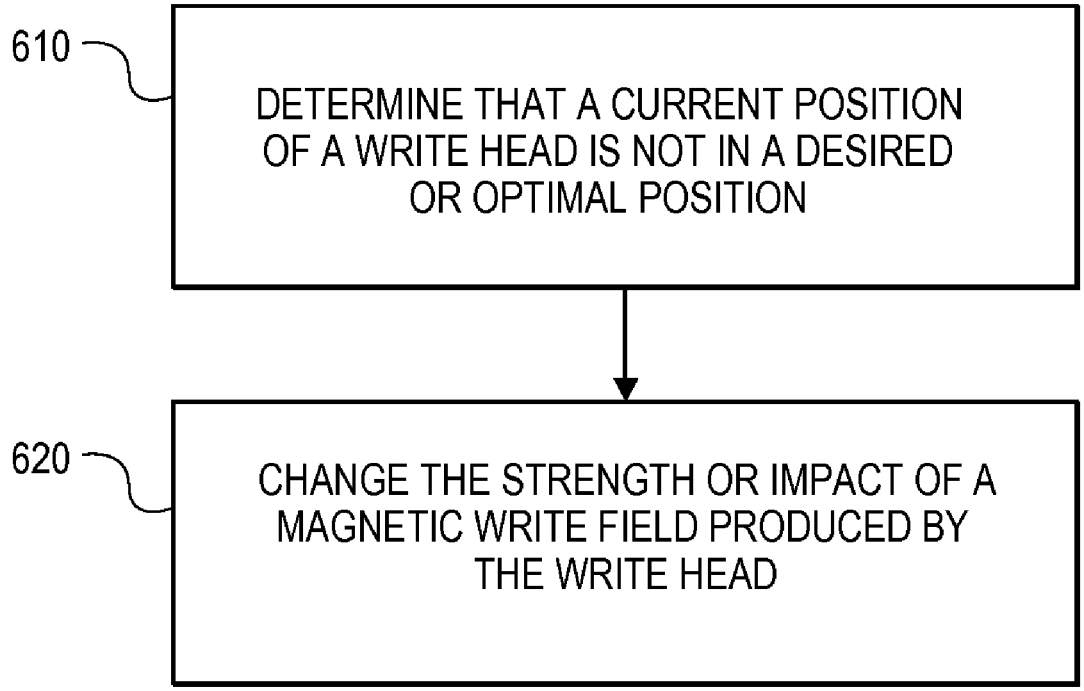
FIG. 6 is a flowchart illustrating the functional steps performed by an HDD comprising current adjustment component according to an embodiment of the invention.

In response to the determination of step 610 of FIG. 6 that the present position of head 210a is not in a desirable or optimal position to write data to a particular location on the surface of the magnetic-recording disk, when performing step 620, micro fly height control 436 may move head 210a closer to or away from the surface of the magnetic-recording disk to cause a change in the strength of the magnetic write field relative to the location on the surface of the magnetic-recording disk to which data is desired to be written. For example, if the current position of head 210a is further away from the location on the surface of the magnetic-recording disk to which data is desired to be written than a desired or optimal position, then micro fly height control 436 may move head 210a closer to the surface of the magnetic-recording disk to cause an increase in the strength of the magnetic-write field relative to the location on the surface of the magnetic-recording disk to which data is desired to be written. On the other hand, if the current position of head 210a is closer to the location on the surface of the magnetic-recording disk to which data is desired to be written than a desired or optimal position, then micro fly height control 436 may move head away 210a from the surface of the magnetic-recording disk to cause a decrease in the strength of the magnetic-write field relative to the location on the surface of the magnetic-recording disk to which data is desired to be written. The change in the strength of the magnetic write field causes data, written by the magnetic-recording head, to be located at the desired location on the magnetic-recording disk.

In an embodiment, micro fly height control 436 may be used to correct an error in the alignment of head 210a by changing the distance between head 210a and the surface of the magnetic-recording disk even if the distance between the current position of head 210a and the surface of the magnetic-recording head is already at an optimal or desired length. In this way, the strength of the magnetic write field, generated by head 210a, may be changed relative to the desired location on the magnetic-recording disk at which data is desired to be written despite an optimal or desired distance is between head 210a and the surface of the magnetic-recording disk.

An embodiment of the invention that employs micro fly height control 436 may, but need not, also employ current adjustment component 420.

Employing a Laser to Address Errors in Position

In an embodiment, HDD 200 may include laser 400. Laser 400 may be located at any location within HDD 200 which enables laser 400 to emit a laser beam on a location on the surface of the magnetic-recording disk at which head 210a attempts to write. For example, in an embodiment, the laser may be integrated onto the back of slider 210b and the extra electrical connections are made to slider 210b or the laser is may be remote to the arm or on the card. In an embodiment, the laser beam emitted by laser 400 is guided to slider 210b through an optical fiber or through an optical waveguide.

In an embodiment, laser 400 may emit a continuous laser beam to be directed at the location on the surface of the magnetic-write disk to which data is intended to be written. Embodiments of the invention may employ laser 400 to assist the process of writing data to the magnetic-recording disk by providing HDD 200 control over the temperature to which a portion of the surface of the magnetic-recording disk is heated as well as the size of the heated area. There is a distinct relationship between the temperature of the surface of the magnetic-recording disk and the strength of the magnetic write field required to write to the heated portion of the magnetic-recording disk. By adjusting the power to laser 400, the heating effect of the laser beam produced by laser 400 may be adjusted. By adjusting the temperature to which the surface of the magnetic-recording disk is heated, the strength of the magnetic write field required to write to the heated location may change.

In this way, in response to a determination that the present position of head 210a is further away than is desirable from an edge of a current track being written (and therefore the strength of the magnetic write field is less than desirable), laser 400 may increase the power to laser 400 by a determined amount to emit a stronger laser beam upon the surface of the magnetic-recording disk at a location at which head 210a is attempting to write data. The amount in which the power to laser 400 is increased is the amount of power necessary to increase the heating effect of the laser beam, produced by laser 400, to cause the desired write location on the disk to be susceptible to the current strength of the magnetic write field relative to the desired write location. In this way, the use of laser 400 to heat a portion of the surface of the magnetic-recording disk may compensate for head 210a being in a spatial position that produces a weaker magnetic write field than is intended, thereby allowing data to be written to the intended location on the surface of the magnetic-recording disk. Similarly, in response to a determination that the present position of head 210a is closer than is desirable to an edge of a current track being written (and therefore the strength of the magnetic write field is stronger than is desirable), laser 400 may decrease the power to laser 400 by a determined amount to emit a weaker laser beam upon the surface of the magnetic-recording disk at a location at which head 210a is attempting to write data. The amount in which the power to laser 400 is decreased is the amount of power necessary to decrease the heating effect of the laser beam, produced by laser 400, to cause the desired write location on the disk to be appropriately susceptible to the current strength of the magnetic write field relative to the desired write location.

In an embodiment, servo controller 410 operates laser 400, and thusly, has the ability to control the power to laser 400. For example, servo controller 410 may adjust the power to laser 400 may adjusting the current or the voltage supplied to laser 400. There is a direct relationship between the power supplied to laser 400 and the resulting size of the area heated by the laser beam produced by laser 400. In this way, the size of the heated area and the temperature of the heated area may be dynamically controlled by server controller 410. The eventual size and characteristics of the thermal gradient of the portion of the magnetic-recording disk heated by the laser will be determined by the strength of the laser beam as well as the thermal conductivity of the magnetic-recording disk.

An embodiment that employs a laser may also employ a current adjustment component. In such an embodiment, servo controller 410 may use a laser in conjunction with a current adjustment component 420 and/or a mechanical actuator 430 to cause data, written by the magnetic-recording head, to be located at the desired location on the magnetic-recording disk.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD), comprising:
   an enclosure;
   a magnetic-recording head;
   a magnetic-recording disk rotatably mounted on a spindle;
   a drive motor mounted in said enclosure, said drive motor having a motor shaft attached to said spindle for rotating said magnetic-recording disk;
   a voice coil motor configured to move said magnetic-recording head to access portions of said magnetic-recording disk;
   a disk controller configured to communicate with the magnetic-recording head and the voice coil motor, wherein the disk controller is configured to instruct the magnetic-recording head to write data to the magnetic-recording disk in one or more shingled tracks; and
   a current adjustment component, wherein the current adjustment component, in response to a servo controller determining that a present position of the magnetic-head head is not in a desired position, changes an amount of current supplied to the magnetic-recording head causing a change in the strength of a magnetic write field produced by the magnetic-recording head, and wherein the change in the strength of the magnetic write field causes data, written by the magnetic-recording head, to be located at a desired location on the magnetic-recording disk,
   wherein the magnetic-recording head writes data to the magnetic-recording disk in one or more shingled tracks using only a corner of the magnetic-recording head.

2. The hard-disk drive (HDD) of claim 1, wherein the hard-disk drive (HDD) further comprises:
   a micro mechanical actuator, wherein the micro mechanical actuator moves the magnetic-recording head relative to a head-arm assembly (HAA) while maintaining a fixed distance between the magnetic-recording head and the surface of the magnetic-recording disk, and wherein the micro mechanical actuator cooperates with the current adjustment component causing data, written by the magnetic-recording head, to be located at the desired location on the magnetic-recording disk.

3. The hard-disk drive (HDD) of claim 1, wherein, in response to a determination that the present position of the magnetic-recording head is further away from an edge of a current track being written than the desired position of the magnetic-recording head, the current adjustment component increases the current supplied to the magnetic-recording head causing an increase in the strength of the magnetic write field.

4. The hard-disk drive (HDD) of claim 1, wherein, in response to the servo controller determining that the present position of the magnetic-recording head is closer to an edge of a current track being written than the desired position of the magnetic-recording head, the current adjustment component decreases the current supplied to the magnetic-recording head causing an decrease in the strength of the magnetic write field.

5. The hard-disk drive (HDD) of claim 1, wherein the data written by the magnetic-recording head is written in one or more shingled tracks that include data other than servo data.

6. The hard-disk drive (HDD) of claim 1, wherein the hard-disk drive (HDD) further comprises:
   a micro fly height control, wherein the micro fly height control is configured to change the distance between the magnetic-recording head and the surface of the magnetic-recording disk causing the strength of the magnetic write field relative to the surface of the magnetic-recording disk to change, and wherein the micro mechanical actuator cooperates with the current adjustment component causing data, written by the magnetic-recording head, to be located at the desired location on the magnetic-recording disk.

7. The hard-disk drive (HDD) of claim 1, wherein the hard-disk drive (HDD) further comprises:
 a laser, wherein the laser is configured to emit a laser beam upon the surface of the magnetic-recording disk causing a portion of the surface of the magnetic-recording disk to become more susceptible to the effects of the magnetic write field by heating the portion, wherein the power supplied to the laser may be changed to adjust the susceptibility of the heated portion of the surface of the magnetic-recording disk to the magnetic write field, and wherein the laser cooperates with the current adjustment component causing data, written by the magnetic-recording head, to be located at the desired location on the magnetic-recording disk.

8. The hard-disk drive (HDD) of claim 7, wherein the hard-disk drive (HDD) further comprises a slider, and wherein the laser is integrated onto the back of the slider.

9. The hard-disk drive (HDD) of claim 7, wherein laser is positioned external to a slider, and wherein the laser beam is directed to the desired location through an optical fiber or through an optical waveguide.

10. A hard-disk drive (HDD), comprising:
 an enclosure;
 a magnetic-recording head;
 a magnetic-recording disk rotatably mounted on a spindle;
 a drive motor mounted in said enclosure, said drive motor having a motor shaft attached to said spindle for rotating said magnetic-recording disk;
 a voice coil motor configured to move said magnetic-recording head to access portions of said magnetic-recording disk;
 a disk controller configured to communicate with the magnetic-recording head and the voice coil motor, wherein the disk controller is configured to instruct the magnetic-recording head to write data to the magnetic-recording disk in one or more shingled tracks; and
 a micro fly height control, wherein the micro fly height control is configured to change the distance between the magnetic-recording head and the surface of the magnetic-recording disk causing a change in the strength of a magnetic write field, produced by the magnetic-recording head, relative to the surface of the magnetic-recording disk, and wherein the change in the strength of the magnetic write field causes data, written by the magnetic-recording head, to be located at a desired location on the magnetic-recording disk,
 wherein the magnetic-recording head writes data to the magnetic-recording disk in one or more shingled tracks using only a corner of the magnetic-recording head.

11. The hard-disk drive (HDD) of claim 10, wherein the hard-disk drive (HDD) further comprises:
 a current adjustment component, wherein the current adjustment component, in response to receiving an instruction from the disk controller, changes an amount of current supplied to the magnetic-recording head causing a change in the strength of the magnetic write field, and wherein the micro mechanical actuator cooperates with the current adjustment component causing data, written by the magnetic-recording head, to be located at the desired location on the magnetic-recording disk.

12. The hard-disk drive (HDD) of claim 10, wherein the hard-disk drive (HDD) further comprises:
 a micro mechanical actuator, wherein the micro mechanical actuator moves the magnetic-recording head relative to a head-arm assembly (HAA) while maintaining a fixed distance between the magnetic-recording head and the surface of the magnetic-recording disk, and wherein the micro mechanical actuator cooperates with the micro fly height control causing data, written by the magnetic-recording head, to be located at the desired location on the magnetic-recording disk.

13. The hard-disk drive (HDD) of claim 10, wherein the hard-disk drive (HDD) further comprises:
 a laser, wherein the laser is configured to emit a laser beam upon the surface of the magnetic-recording disk causing a portion of the surface of the magnetic-recording disk to become more susceptible to the effects of the magnetic write field by heating the portion, wherein the power supplied to the laser may be changed to adjust the susceptibility of the heated portion of the surface of the magnetic-recording disk to the magnetic write field, and wherein the laser cooperates with the micro fly height control causing data, written by the magnetic-recording head, to be located at the desired location on the magnetic-recording disk.

14. A hard-disk drive (HDD), comprising:
 an enclosure;
 a magnetic-recording head;
 a magnetic-recording disk rotatably mounted on a spindle;
 a drive motor mounted in said enclosure, said drive motor having a motor shaft attached to said spindle for rotating said magnetic-recording disk;
 a voice coil motor configured to move said magnetic-recording head to access portions of said magnetic-recording disk; and
 a disk controller configured to communicate with the magnetic-recording head and the voice coil motor, wherein the disk controller is configured to instruct the magnetic-recording head to write data to the magnetic-recording disk in one or more shingled tracks; and
 a laser, wherein the laser is configured to emit a laser beam upon the surface of the magnetic-recording disk causing a portion of the surface of the magnetic-recording disk to become more susceptible to the effects of the magnetic write field by heating the portion, wherein the power supplied to the laser may be changed to adjust the susceptibility of the heated portion of the surface of the magnetic-recording disk to the magnetic write field, and wherein the adjustment of the susceptibility of the heated portion of the surface of the magnetic-recording disk to the magnetic write field causes data, written by the magnetic-recording head, to be located at the desired location on the magnetic-recording disk.

15. The hard-disk drive (HDD) of claim 14, wherein the hard-disk drive (HDD) further comprises:
 a micro mechanical actuator, wherein the micro mechanical actuator moves the magnetic-recording head relative to a head-arm assembly (HAA) while maintaining a fixed distance between the magnetic-recording head and the surface of the magnetic-recording disk, and wherein the micro mechanical actuator cooperates with the laser causing data, written by the magnetic-recording head, to be located at the desired location on the magnetic-recording disk.

16. The hard-disk drive (HDD) of claim 14, wherein the hard-disk drive (HDD) further comprises:

a micro fly height control, wherein the micro fly height control is configured to change the distance between the magnetic-recording head and the surface of the magnetic-recording disk causing the strength of a magnetic write field, produced by the magnetic-recording head, to change relative to the surface of the magnetic-recording disk, and wherein the micro mechanical actuator cooperates with the laser causing data, written by the magnetic-recording head, to be located at the desired location on the magnetic-recording disk.

17. The hard-disk drive (HDD) of claim 14, wherein the hard-disk drive (HDD) further comprises:

a current adjustment component, wherein the current adjustment component, in response to receiving an instruction from the disk controller, changes an amount of current supplied to the magnetic-recording head causing a change in the strength of a magnetic write field produced by the magnetic-recording head, and wherein the change in the strength of the magnetic write field causes data, written by the magnetic-recording head, to be located at a desired location on the magnetic-recording disk, and wherein the laser cooperates with the current adjustment component causing data, written by the magnetic-recording head, to be located at the desired location on the magnetic-recording disk.

18. The hard-disk drive (HDD) of claim 14, wherein the hard-disk drive (HDD) further comprises a slider, and wherein the laser is integrated onto the back of the slider.

19. The hard-disk drive (HDD) of claim 14, wherein laser is positioned external to a slider, and wherein the laser beam is directed to the desired location through an optical fiber or through an optical waveguide.

* * * * *